US007527337B2

(12) United States Patent
Clay et al.

(10) Patent No.: US 7,527,337 B2
(45) Date of Patent: May 5, 2009

(54) COLLAPSIBLE CHAIR AND METHOD

(75) Inventors: Michael Clay, Gibsonia, PA (US); Bryan Hotaling, Acton, MA (US)

(73) Assignee: Evolution Seating, LLC, Gibsonia, PA (US)

( * ) Notice: Subject to any disclaimer, the term of this patent is extended or adjusted under 35 U.S.C. 154(b) by 0 days.

(21) Appl. No.: 11/529,832

(22) Filed: Sep. 29, 2006

(65) Prior Publication Data

US 2007/0080571 A1 Apr. 12, 2007

Related U.S. Application Data

(60) Provisional application No. 60/722,265, filed on Sep. 30, 2005.

(51) Int. Cl.
*B60N 2/02* (2006.01)

(52) U.S. Cl. ................................................ 297/378.12

(58) Field of Classification Search ............ 297/378.12, 297/378.1, 411.36, 451.4, 451.5, 451.6, 445.1, 297/378.14, 411.32

See application file for complete search history.

(56) References Cited

U.S. PATENT DOCUMENTS 757,492 A 4/1904 Palmer
2,163,078 A 6/1939 Zerbee
2,400,630 A * 5/1946 Cramer et al. ......... 297/378.12
2,409,316 A 10/1946 Rogers, Sr.
3,881,770 A * 5/1975 Cardenas ..................... 297/51
4,832,406 A 5/1989 Adams et al.
4,881,776 A * 11/1989 Wang ...................... 297/378.1
4,938,534 A 7/1990 Tornero
5,069,503 A 12/1991 Martinez
5,114,212 A 5/1992 Verney et al.
5,785,383 A 7/1998 Otero
6,238,002 B1 * 5/2001 Brewer et al. .......... 297/411.32
6,257,668 B1 * 7/2001 Chou et al. ............ 297/411.32
6,464,300 B2 10/2002 Grove
6,494,539 B2 12/2002 Frank
6,554,353 B1 4/2003 Yu
6,786,553 B1 9/2004 Grove
7,293,825 B2 11/2007 Vergara et al.
2002/0113481 A1 8/2002 Grove
2006/0103177 A1 5/2006 Vergara et al.

* cited by examiner

*Primary Examiner*—Milton Nelson, Jr.
(74) *Attorney, Agent, or Firm*—Ansel M. Schwartz

(57) ABSTRACT

A chair with a chair back pivotally attached to a seat. The chair back can be moved from a collapsed position located directly adjacent the seat to an upright position. When in the upright position, a spring biased latch assembly attached to chair seat allows engagement with the chair back and can be adjusted to several, adjustable positions selected by the user. In addition to providing a range of adjustment, this latch system also provides structural integrity to the design of the pivoting chair invention.

6 Claims, 9 Drawing Sheets

COLLAPSIBLE CHAIR AND METHOD

This application claims the benefit of U.S. Provisional Application No.: Application Ser. No. 60/722,265 FILING DATE Sep. 30, 2005.

FIELD OF THE INVENTION

The field of this invention relates to a chair where the back of the chair can be pivoted from a fully collapsed position, for packing and shipping purposes, located directly against the seat of the chair to an upright, adjustable position, that is within the normal position of usage. Armrests attach independently of the pivoting mechanism and allow the design to have a range of flexibility as it applies to the armrest style and functionality.

BACKGROUND OF THE INVENTION

A typical chair has a seat and a back rest. This configuration of a chair is not conducive to shipping after being manufactured for the reason that an assembled chair inherently occupies a substantial amount of space. It is common for chairs to be manufactured in overseas manufacturing facilities meaning that the chairs are required to be put into cartons and then shipped by shipping containers to the United States or their final destination. The size of the shipping carton for a chair, which contains a back fastened to a seat in the normal upright manner, is of a significant size and therefore limits the number of shipping cartons that can be placed within a shipping container. This increased carton size directly correlates with the shipping cost and results in significantly higher cost per chair.

On the other hand, to save freight costs, it is common to ship the chair in a fully knocked down fashion. Shipping in this manner requires the consumer to have to assemble the chair which is time consuming and often complicated.

In today's manufacturing environment, it is common practice to detach the chair back from the seat. The back can then be placed against the seat and packaged with the other chair components with the resulting in a significantly more compact unit for purposes of shipping. Once the disassembled chair reaches the retailer or end user, either the retailer or the consumer is required to then assemble the chair. Assembly usually requires properly positioning the chair components and using several bolt type fasteners to be installed and tightened. End users find this process to be undesirable, time consuming and even difficult for those certain individuals that have a minimal amount of mechanical aptitude.

The invention creates a solution to a common shipping issue by reducing its shipping cube size and more importantly provides a quick, easy and time saving method for the consumer to set up the chair without the use of tools or fasteners. This is a very desirable product attribute for the consumer and an advantageous feature for the manufacturing facility and retailer.

BRIEF SUMMARY OF THE INVENTION

Both the trade and consumer benefits substantially from the chair design of the present invention.

The trade/retailer benefits from attractive manufacturing and shipping cost structures.

The trade/retailer can offer an easy to set up chair to the consumer—a benefit that is very appealing and offers a unique marketing appeal.

The trade/retailer benefits from reduced inventory space requirements for this style chair.

The consumer can quickly and easily assemble the chair without the need for tools or fasteners. This design allows the user to begin its use very quickly and easily.

The consumer has the ability through this invention to pivot the backrest to a position that is conducive to their work environment and comfort range.

The consumer benefits from a chair design that has the flexibility to add armrests in a range of styles.

The primary objectives of this invention is to construct a chair that is collapsible for purposes of shipping, but upon reaching the retailer or end user, the chair can be moved from its collapsed position to a normal usage position without requiring the using of any fasteners or the use of any tools.

The present invention pertains to a chair. The chair comprises a seat having adjustable armrests. The chair comprises a back which is connected to the seat and which pivots relative to the seat while it is connected to the seat between a collapsed state where the seat and the back are essentially parallel with each other and the back defines a plane, and an open state with the back and the seat are essentially perpendicular. The armrests, the back and the seat collapsed to a compact level which allows the chair to be packed in its most compact form with the height of the armrests even or lower than the plane of the back and its collapsed position.

The present invention pertains to a chair. The chair comprises a seat. The chair comprises a back. The chair comprises means for pivoting the back between a collapsed state and an open state with the seat. The chair comprises means for locking and unlocking the back relative to the seat.

The present invention pertains to a method for using a chair. The method comprises the steps of pivoting a back relative to a chair while it is connected to the seat to a collapsed state where the seat and the back are essentially parallel with each other, and the back defines a plane. There is the step of moving adjustable armrests of the seat to a collapsed state so the armrests, the back and the seat are collapsed to a compact level which allows the chair to be packed in its most compact form with the height of the armrests even or lower than the plane of the back in its collapsed state. There is the step of pivoting the back relative to the seat while it is connected to the seat to an open state while the back and the seat are essentially perpendicular.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 2:
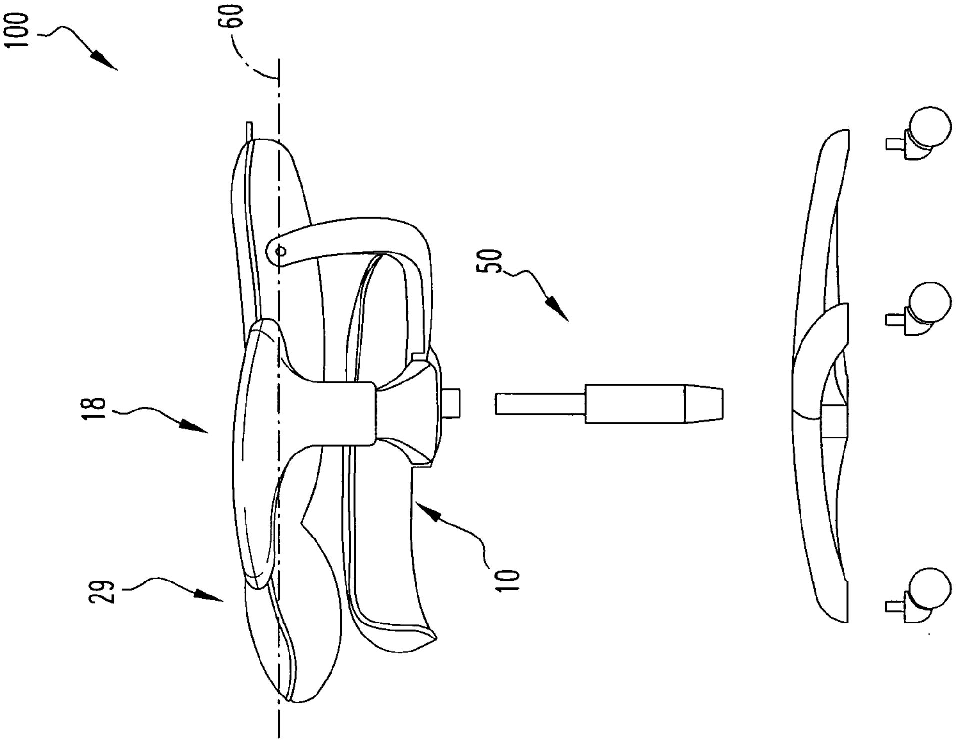
FIG. 2 is a view similar to FIG. 1 but with the chair with pivotable back of this invention in the collapsed position; armrests are fully collapsed for compact shipment and shown is a disassembled compact state for shipping.
Figure 1:
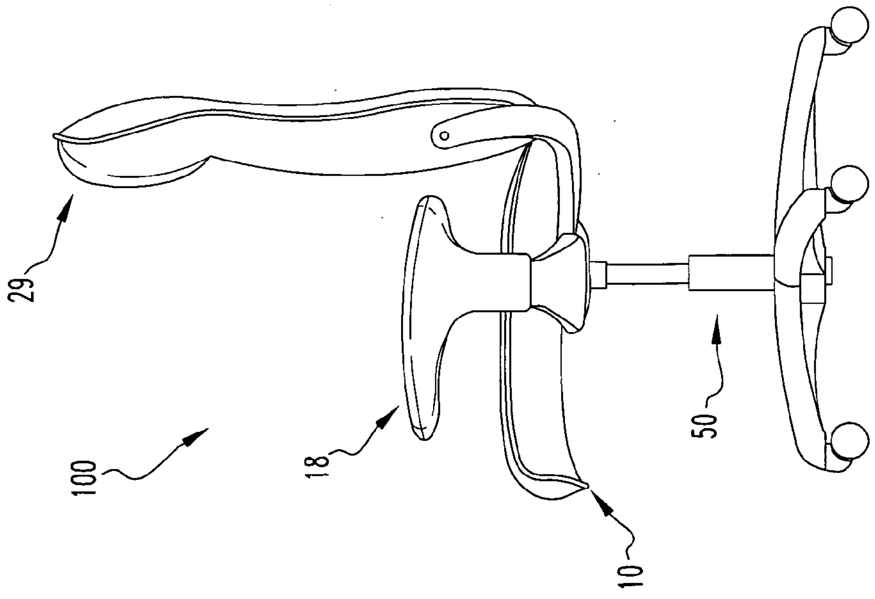
FIG. 1 is a view showing the chair with pivotable back of the present invention in the fully engaged, upright position.
Figure 4:
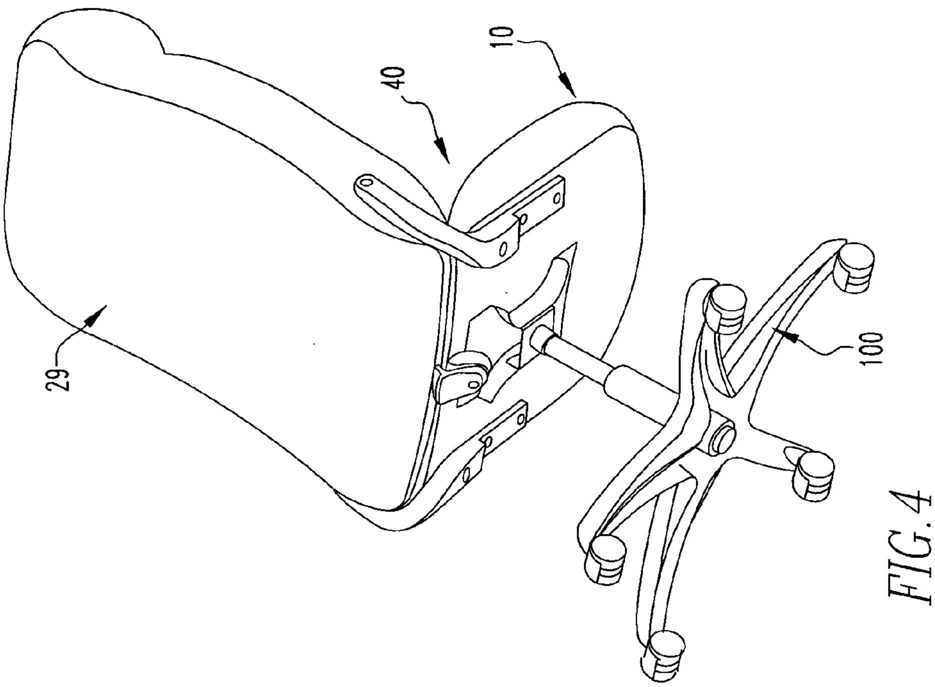
FIG. 4 is a view similar to FIG. 3 but shows the pivot brackets that are separate from the armrest assembly.
Figure 3:
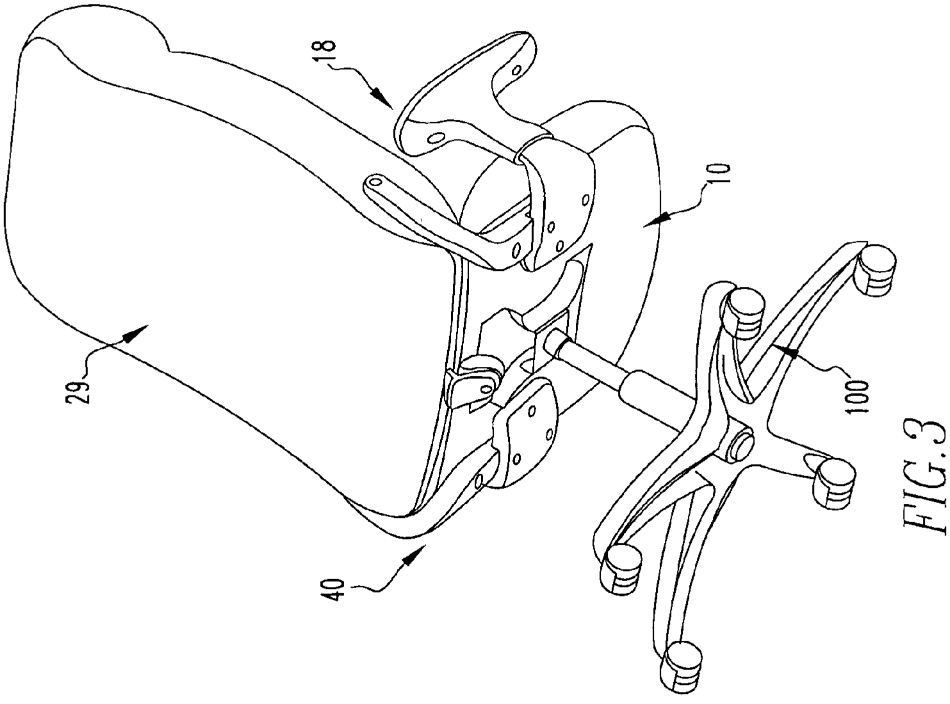
FIG. 3 is a view of the chair from the back, underneath side showing the latch mechanism fully engaged, the adjustable armrests in place and the hinged brackets mounted to the seat and backrest.
Figure 5:
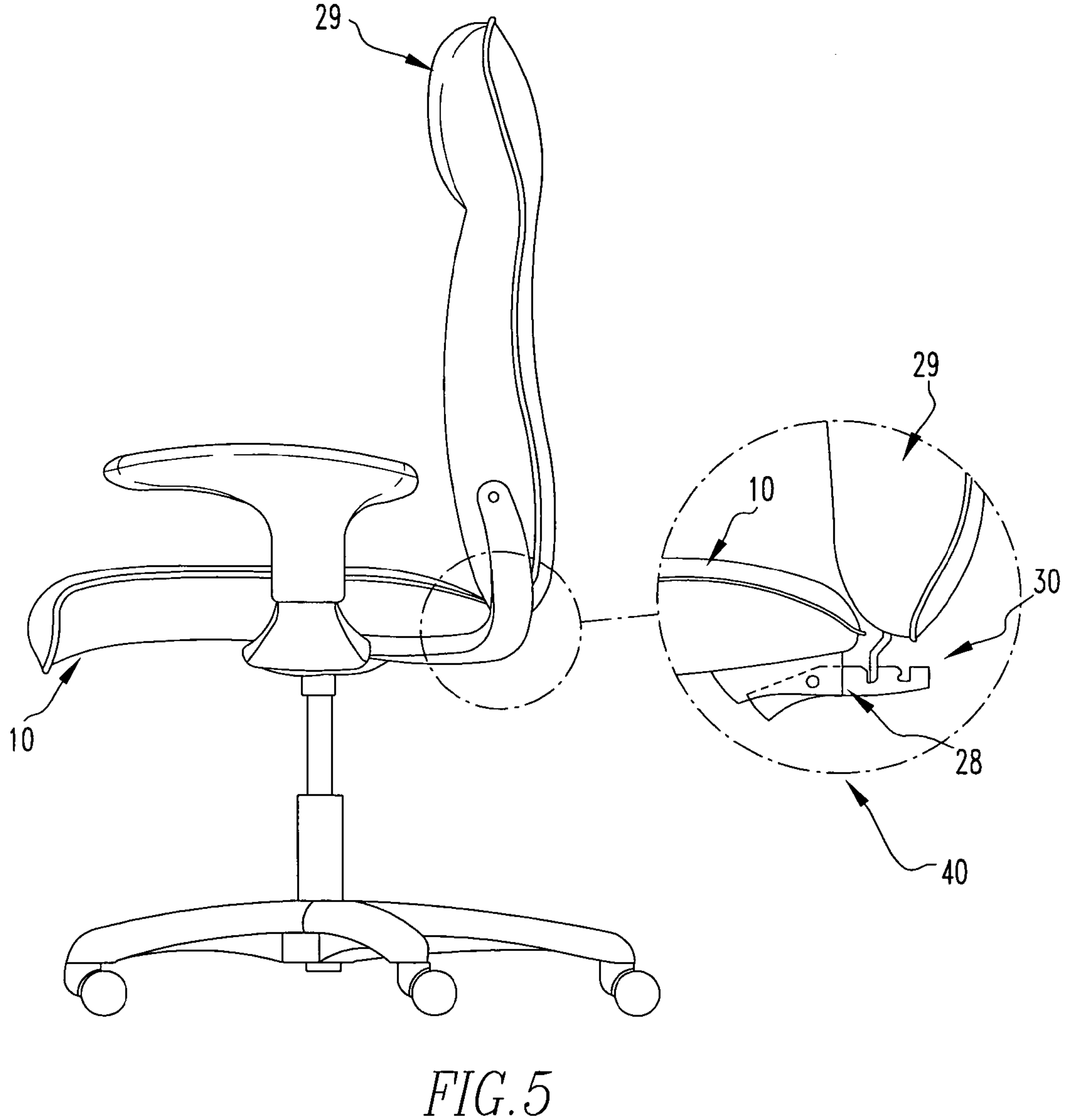
FIG. 5 is a side view of the chair with an enlarged view of the spring biased latch assembly mounted on the underside, back side of chair seat and a receiving bracket on the chair back.

Referring now to the drawings wherein like reference numerals refer to similar or identical parts throughout the several views, and more specifically to FIGS. 1 and 2 thereof, there is shown a chair 100. The chair 100 comprises a seat 10 having adjustable armrests 18. The chair 100 comprises a back 29 which is connected to the seat 10 and which pivots relative to the seat 10 while it is connected to the seat 10 between a collapsed state where the seat 10 and the back 29 are essentially parallel with each other and the back defines a plane 60, and an open state with the back 29 and the seat 10 are essentially perpendicular. The armrests 18, the back 29 and the seat 10 collapse to a compact level which allows the chair 100 to be packed in its most compact form with the height of the armrests 18 even or lower than the plane 60 of the back 29 and its collapsed position.

Preferably, the chair 100 includes a pivot assembly 40 attached to the seat 10 and the back 29 about which the back 29 pivots, locks and unlocks relative to the seat 10. The adjustable armrests 18 preferably operate independent of the pivoting of the back 29. Preferably, the pivot assembly 40 includes support brackets attached to the seat 10 and pivot brackets attached to the back 29 and respective support brackets about which the back 29 pivots relative to the seat between the open and collapsed state.

The pivoting assembly 40 preferably includes a spring bias latch assembly mounted to the seat, and a locator tab located on the back that engages with the latch assembly allowing the usage position the back in several adjustable upright positions. Preferably, each armrest 18 has pads. The chair 100 preferably includes a pedestal 50 upon which the seat is supported. Preferably, the pedestal 50 or star base has wheels on which the pedestal 50 moves.

The present invention pertains to a chair 100. The chair 100 comprises a seat. The chair 100 comprises a back 29. The chair 100 comprises means for pivoting the back 29 between a collapsed state and an open state with the seat 10. The chair 100 comprises means for locking and unlocking the back 29 relative to the seat 10.

The present invention pertains to a method for using a chair 100. The method comprises the steps of pivoting a back 29 relative to a chair 100 while it is connected to the seat 10 to a collapsed state where the seat 10 and the back 29 are essentially parallel with each other, and the back 29 defines a plane 60. There is the step of moving adjustable armrests 18 of the seat 29 to a collapsed state so the armrests 18, the back 29 and the seat 10 are collapsed to a compact level which allows the chair 100 to be packed in its most compact form with the height of the armrests even or lower than the plane 60 of the back in its collapsed state. There is the step of pivoting the back 29 relative to the seat 10 while it is connected to the seat to an open state while the back 29 and the seat 10 are essentially perpendicular.

Preferably, the pivoting to an open state step includes the step of pivoting pivot brackets on the back about support brackets on the seat. The pivoting to an open state step preferably includes the step of adjusting the armrests independent of the pivoting of the back.

Figure 6:
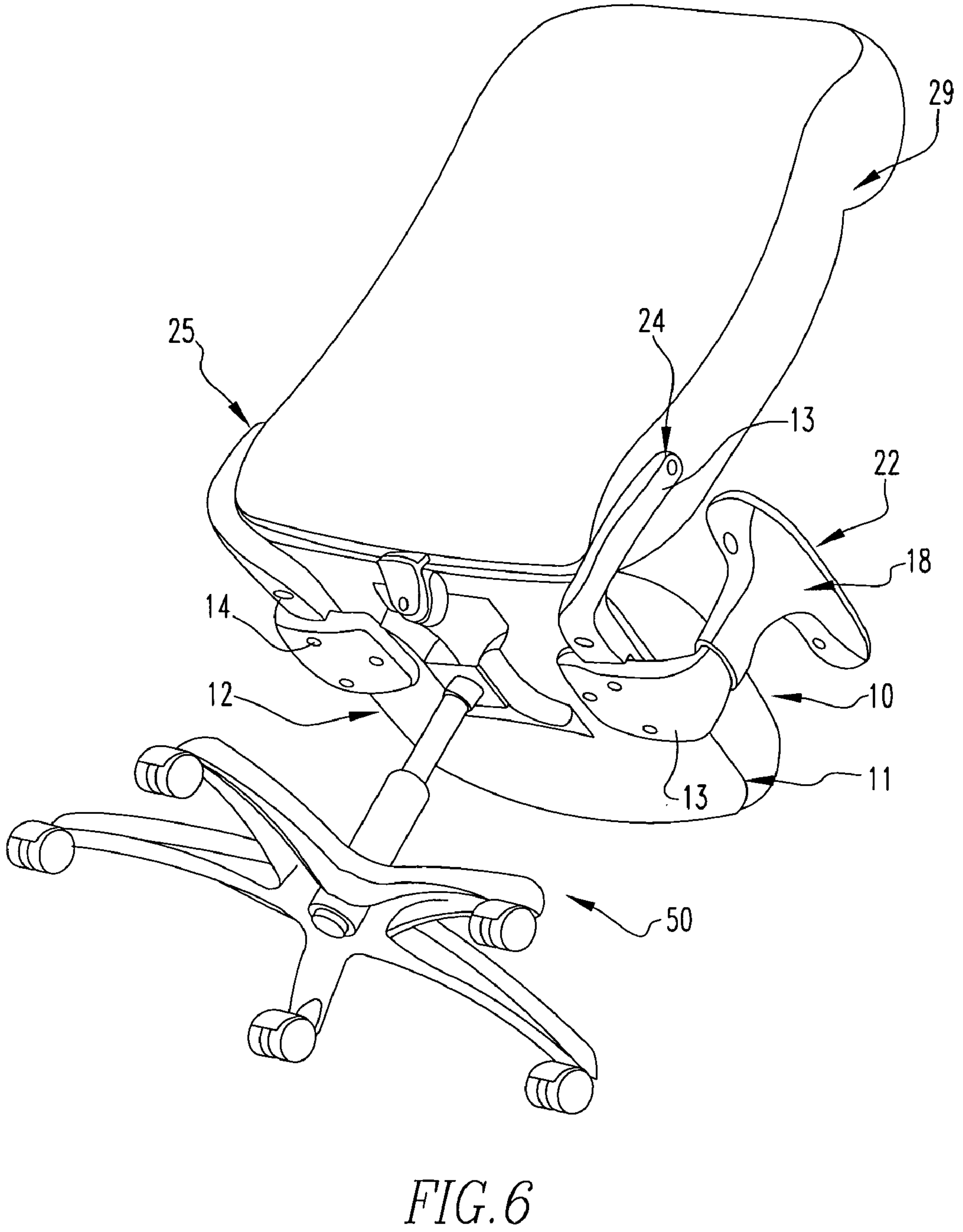
FIG. 6 is an underside perspective view of the chair.

The pivoting means and the locking and unlocking means are shown in FIG. 6.

In the operation of the invention, the invention provides a very simple, easy to use solution for building a chair 100 which commonly requires full assembly by the user. The pivot brackets mount to the underside of the seat surface in several points and are constructed separately from the armrests 18. The armrests 18 which can be optional and separate from this design incorporate into the pivot brackets to provide additional strength to the bracket design.

The armrest design allows for the armrest to adjust in several user adjustable positions and also in a fully collapsed position that allows for a very compact shipping cube. The top of the armrest positions in its fully collapsed state, at the level or lower than the seat back in its fully collapsed state as seen in FIG. 2.

Referring particularly to the drawings, FIG. 6 of this invention. The chair 100 includes a substantially planar seat 10. A person's buttocks (not shown) is adapted to be located on the upper surface of the seat 10. The seat 10 has side edges 11 and 12. Fixedly mounted to the side edge or underneath edge 11 is a first support bracket 13. A second support bracket 14 is fixedly mounted to the side edge or underneath edge 12. Armrest 18 includes a cushioned pad 22. Armrest 20 includes a similar cushioned pad 23. Normally, the cushioned pads 22 and 23 will be constructed of a rigid material covered with a cushioning material made of leather and plastic combined with foam or some other similar cushioning material.

Mounted within the chair back 29 and connecting with the side edge is a pivot bracket 24. Also mounted within the chair back 29 and connecting with the side edge is a second pivot bracket 25. Each pivot bracket 24 and 25 is constructed in precisely the same manner. The pivot brackets 24 and 25 attach to support bracket 13 and support bracket 14 via a bushing and shoulder screw and provide a free moving pivot joint that allows the chair back 29 to be pivoted above seat surface.

Figure 7:
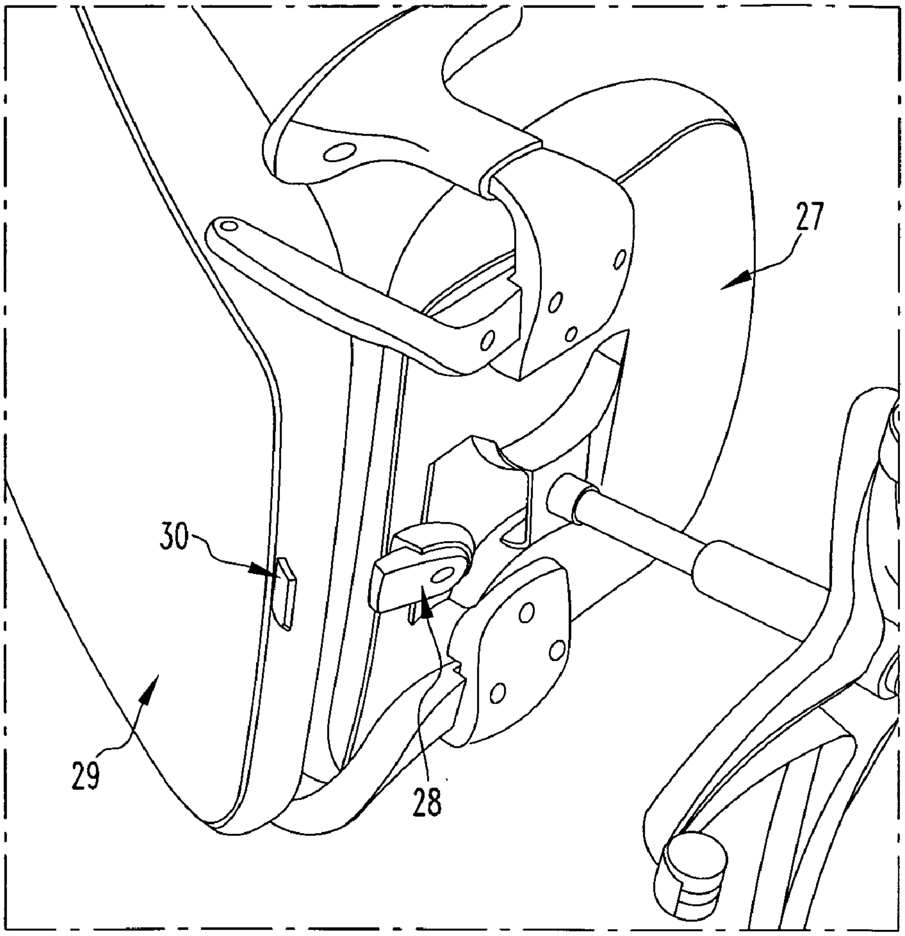
FIG. 7 is an underside perspective view of the seat of the chair.
Figure 9:
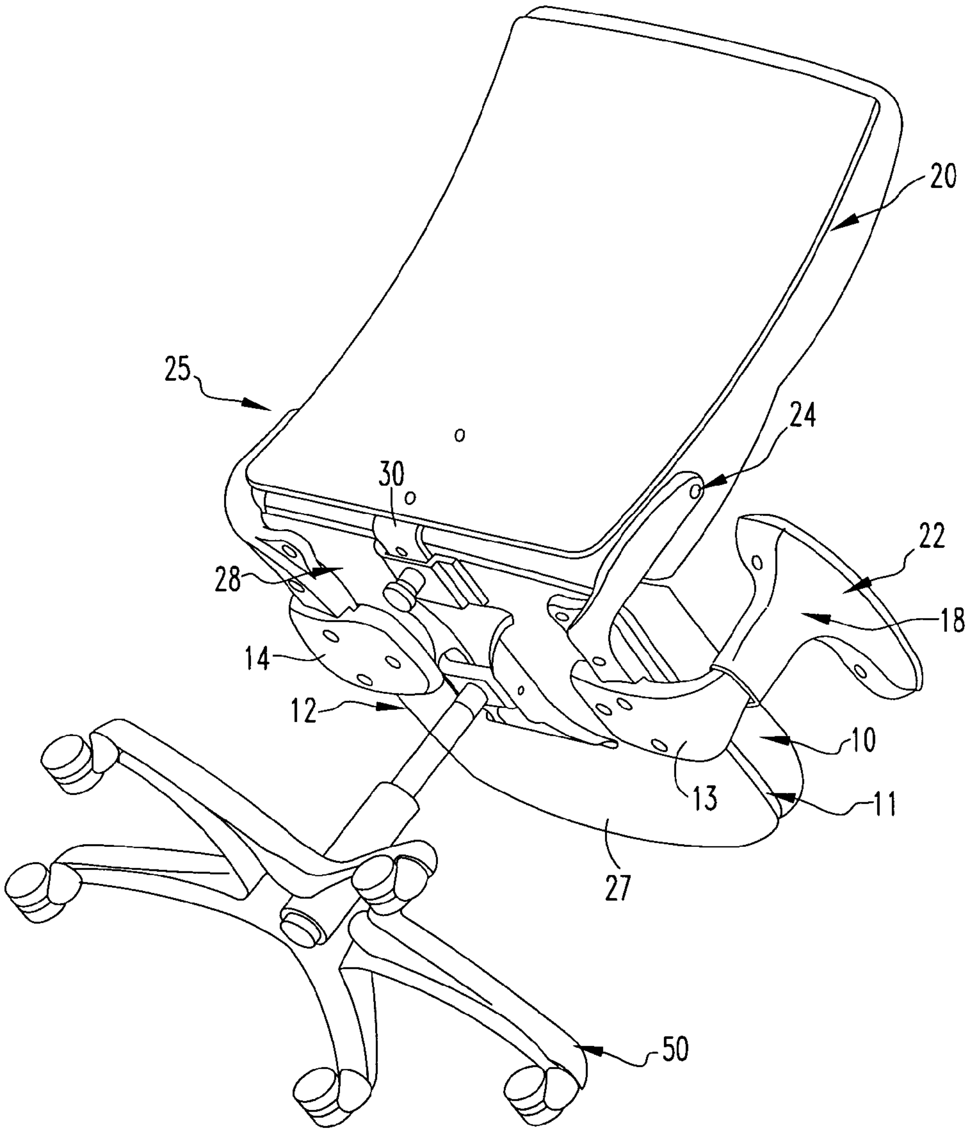
FIG. 9 is an underside perspective view of the chair with an alternative embodiment of the pivot assembly.
Figure 10:
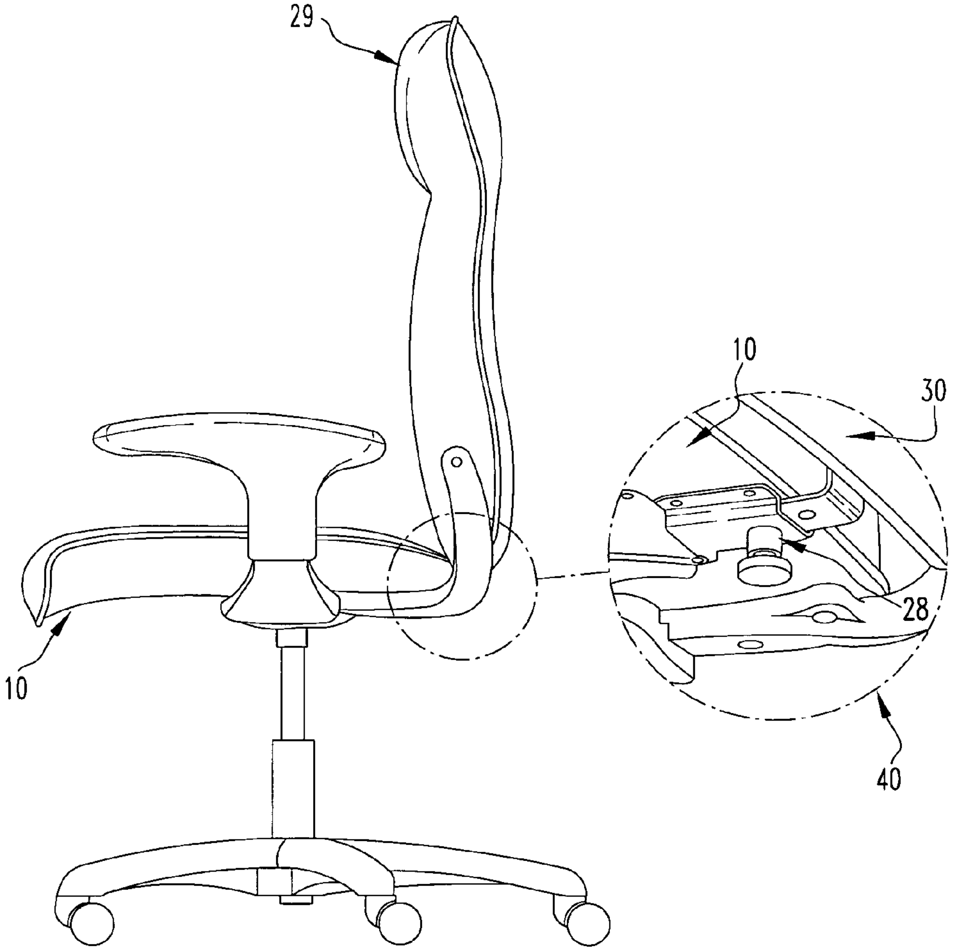
FIG. 10 is a side view of the alternative embodiment of the pivot assembly with an enlarged view of the spring biased latch assembly mounted on the underside, back side of chair seat and a receiving bracket on the chair back.
Figure 11:
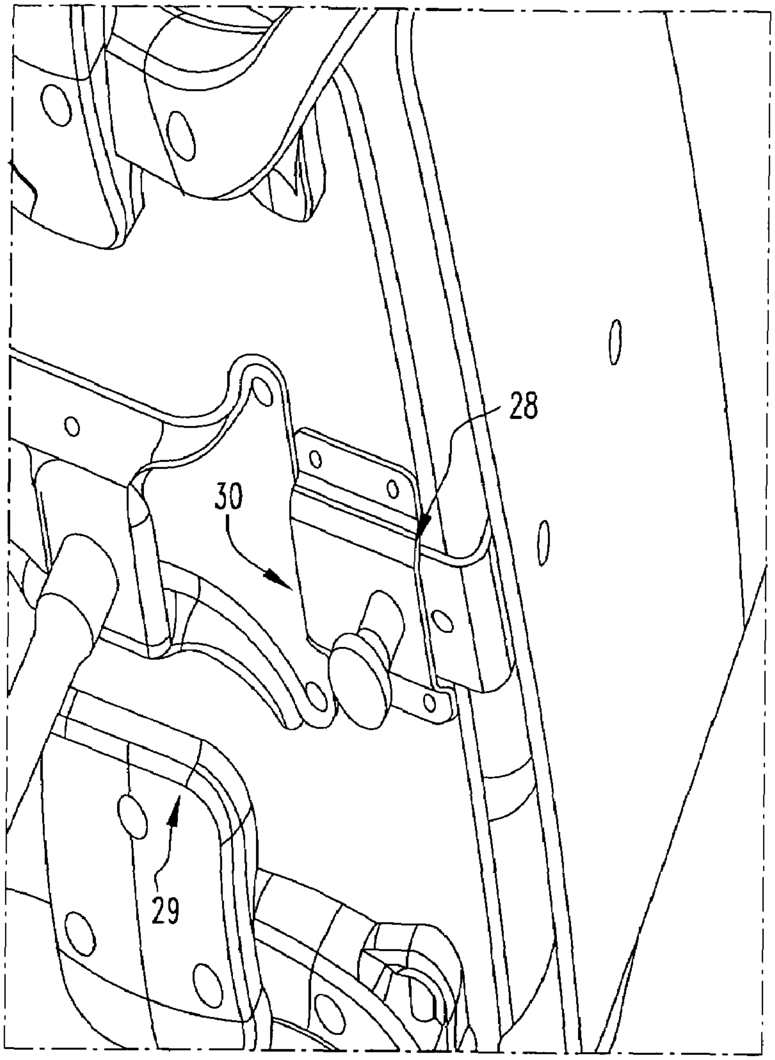
FIG. 11 is an underside perspective view of the alternative embodiment of the pivot assembly of the chair.

Referring particularly to the drawings, and FIG. 7 of this invention. The chair 100 has a bottom surface 27 whereas a spring biased latch assembly 28 is located at the rear edge of surface 27. The back 29 has an integrated locator tab 30 which engages with the spring biased latch assembly 28 when the backrest is pivoted from a collapsed position to upright position. The engagement provides several adjustable locations and locks the pivoting back 29 in place for use. In the alternative embodiment of the hinge shown in FIGS. 9-11, a pin of the latch assembly fits into a desired hole in the tab 30 to hold the back 29 to the seat 10. By varying which hole the pin is in, it changes the position of the back 29 and how much the back 29 is able to pivot. This provides structural integrity to the chair 100 and adjustability for the user unique to this design.

As the chair back is moved from the collapsed position, to the upright position, when the chair back 29 has been moved about 80 degrees, the locator tab 30 will come into contact with the spring biased latch assembly 28. As the chair back 29 continues to move toward the upright position, the user will press/pull on the spring biased latch assembly to allow the locator tab to locate within several positions. It is to be noted that spring latch assembly 28 exerts a constant upward bias tending to maintain via holes in tube the locator tab in the fixed position.

Figure 8:
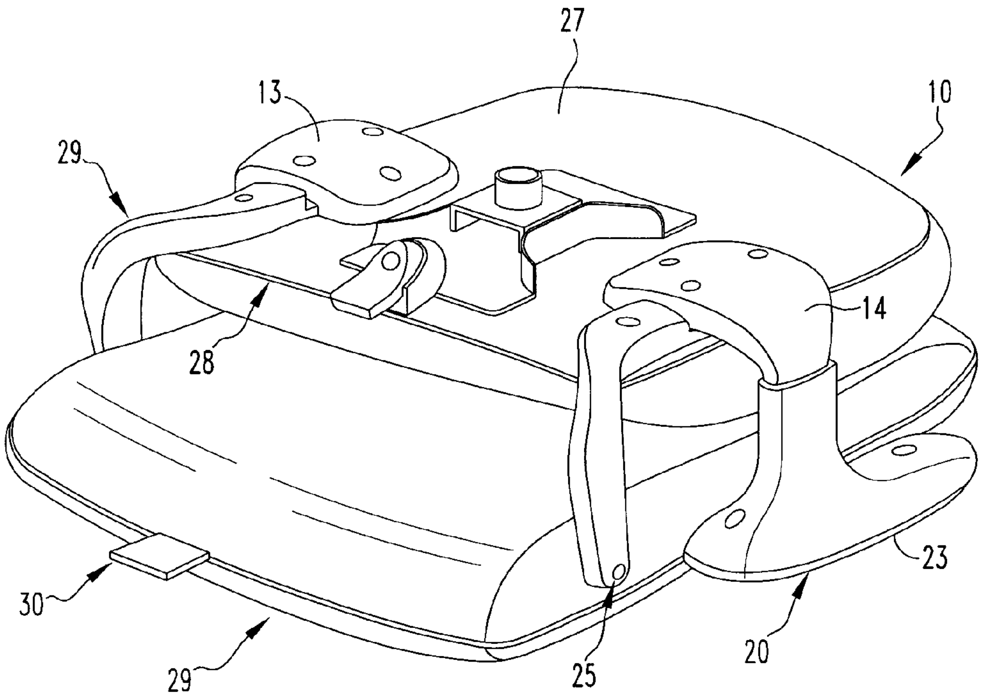
FIG. 8 is a perspective view of the chair in a closed state.

Referring particularly to FIG. 8 of this invention. This view shows the invention in its collapsed state. The locator tab 30 can be seen along with the spring biased latch assembly 28, side edge bracket assembly 24, side edge bracket assembly 25.

The adjustable armrest 18 and adjustable armrest 20 can be seen in their fully collapsed position. This fully collapsed position allows the chair 100 to fully collapse to its most compact, space efficient form.

Patents incorporated by reference herein:
Grove U.S. Pat. No.- 6,786,553 Chair with Pivotable Back
Grove U.S. Pat. No.- 6,464,300 Collapsible Chair Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A chair comprising:
- a seat having adjustable armrests;
- a back which is connected to the seat and which pivots relative to the seat while it is connected to the seat between a collapsed state where the seat and the back are essentially parallel with each other and the back defines a plane, and an open state with the back and the seat are essentially perpendicular with each other, in the collapsed state, the armrests, the back and the seat collapsed to a compact level which allows the chair to be packed in its most compact form with the height of the armrests even or lower than the plane of the back; a pivot assembly attached to the seat and the back about which the back pivots, locks and unlocks relative to the seat, the armrests spaced apart from the pivot assembly, the adjustable armrests operate independent of the pivoting of the back, the pivot assembly includes first and second support brackets attached to the seat and first and second pivot brackets attached to the back and the first and second support brackets, respectively, about which the back pivots relative to the seat between the open and collapsed state, the pivot assembly includes a spring bias latch assembly mounted to the seat, and a locator tab located on the back that engages with the latch assembly allowing the back in the open state to be able to be positioned in one of several adjustable upright positions; and
- a pedestal having a pole that extends from a base upon which the seat is supported.

2. A chair as described in claim 1 wherein each armrest has pads.

3. A chair as described in claim 2 wherein the pedestal has wheels connected to the base on which the pedestal moves.

4. A chair comprising:
- a seat having adjustable armrests;
- aback;
- means for pivoting the back between a collapsed state and an open state with the seat; and
- means for locking and unlocking the back relative to the seat separate and apart from the pivoting means and the arm rests, the adjustable armrests operate independent of the pivoting of the back, the pivoting means includes first and second support brackets attached to the seat and first and second pivot brackets attached to the back and the first and second support brackets, respectively, about which the back pivots relative to the seat between the open and collapsed state, the pivoting means includes a spring bias latch assembly mounted to the seat, and a locator tab located on the back that engages with the latch assembly allowing the back in the open state to be able to be positioned in one of several adjustable upright positions.

5. A method for using a chair comprising the steps of:
- pivoting a back relative to a seat while the back is connected to the seat through a pivot assembly attached to the seat and the back to a collapsed state where the seat and the back are essentially parallel with each other, and the back defines a plane, the seat supported on a pedestal having a pole that extends from a base;
- moving adjustable armrests of the seat spaced apart from the pivot assembly and independent of the pivoting of the back to a collapsed state so the armrests, the back and the seat are collapsed to a compact level which allows the chair to be packed in its most compact form with the height of the armrests even or lower than the plane of the back in its collapsed state; and
- pivoting the back relative to the seat while it is connected to the seat to an open state where the back and the seat are essentially perpendicular, including the step of pivoting the back about pivot brackets of the pivot assembly; and
- engaging a locator tab on the back with a latch assembly mounted to the seat which places the back in the open state in one of several upright positions.

6. A method as described in claim 5 wherein the pivoting to an open state step includes the step of pivoting the back about said pivot brackets of the pivot assembly on the back which are attached to support brackets of the pivot assembly on the seat.

* * * * *